US009940895B1

(12) United States Patent
Klein et al.

(10) Patent No.: US 9,940,895 B1
(45) Date of Patent: Apr. 10, 2018

(54) DISPLAYS WITH SAFETY SEGREGATION

(71) Applicant: Rockwell Collins, Inc., Cedar Rapids, IA (US)

(72) Inventors: Clifford R. Klein, Marion, IA (US); Chad M. Williams, North Liberty, IA (US)

(73) Assignee: Rockwell Collins, Inc., Cedar Rapids, IA (US)

( * ) Notice: Subject to any disclaimer, the term of this patent is extended or adjusted under 35 U.S.C. 154(b) by 11 days.

(21) Appl. No.: 15/169,415

(22) Filed: May 31, 2016

(51) Int. Cl.
*G09G 5/00* (2006.01)
*B64D 43/00* (2006.01)
*B64C 13/50* (2006.01)

(52) U.S. Cl.
CPC ........... *G09G 5/003* (2013.01); *B64C 13/503* (2013.01); *B64D 43/00* (2013.01)

(58) Field of Classification Search
None
See application file for complete search history.

(56) References Cited

U.S. PATENT DOCUMENTS

| 9,703,476 | B1* | 7/2017 | Pappas | G06F 3/04847 |
| 2009/0157703 | A1* | 6/2009 | Henninger | G01C 23/00 |
| 2011/0251739 | A1* | 10/2011 | Tomas | B64C 13/503 |
|  |  |  |  | 701/3 |
| 2017/0004610 | A1* | 1/2017 | Lamkin | G06T 7/0002 |

* cited by examiner

*Primary Examiner* — Vu Nguyen
(74) *Attorney, Agent, or Firm* — Angel N. Gerdzhikov; Donna P. Suchy; Daniel M. Barbieri

(57) ABSTRACT

Display systems and methods for configuring such display systems are disclosed. A display system may include a display and a monitoring processor in communication with the display. The monitoring processor may be configured to monitor a status of a device and present the status of the device on the display. The display system may also include a control processor in communication with the display. The control processor may be configured to operate independently with respect to the monitoring processor. The control processor may be further configured to process a user input and facilitate control of the device based on the user input received.

20 Claims, 4 Drawing Sheets

DISPLAYS WITH SAFETY SEGREGATION

BACKGROUND

Electronic displays (may be simply referred to as displays) are devices configured to present images and/or text electronically. Modern aircraft use displays to present flight information. A pilot, for example, may use one or more displays referred to as synoptic display(s) to monitor the status of various devices onboard an aircraft.

For safety reasons, synoptic displays are typically provided only with the abilities to display the status information, and are prohibited from serving as interfaces for controlling the devices onboard the aircraft. Separate control panels are typically provided as control interfaces, and as the number of devices increases, the number of control panels may increase accordingly, leading to crowded flight decks.

SUMMARY

In one aspect, embodiments of the inventive concepts disclosed herein are directed to a system. The system may include a display and a monitoring processor in communication with the display. The monitoring processor may be configured to monitor a status of a device and present the status of the device on the display. The system may also include a control processor in communication with the display. The control processor may be configured to operate independently with respect to the monitoring processor. The control processor may be further configured to process a user input and facilitate control of the device based on the user input received.

In a further aspect, embodiments of the inventive concepts disclosed herein are directed to a system. The system may include a display and a monitoring processor in communication with the display. The monitoring processor may be configured to monitor a status of a device and present the status of the device on the display. The system may also include a control processor in communication with the display. The control processor may be configured to operate independently with respect to the monitoring processor. The control processor may be further configured to present a control interface of the device on the display, process a user input, and facilitate control of the device based on the user input received.

In another aspect, embodiments of the inventive concepts disclosed herein are directed to a method. The method may include: monitoring a status of a device utilizing a monitoring processor; presenting the status of the device monitored by the monitoring processor on a display; presenting a control interface of the device on the display; sending a user input received through the control interface to a control processor, wherein the control processor is configured to operate independently with respect to the monitoring processor; and facilitating control of the device utilizing the control processor.

It is to be understood that both the foregoing general description and the following detailed description are exemplary and explanatory only and are not restrictive of the inventive concepts disclosed and claimed herein. The accompanying drawings, which are incorporated in and constitute a part of the specification, illustrate embodiments of the inventive concepts and together with the general description, serve to explain the principles and features of the inventive concepts disclosed herein.

BRIEF DESCRIPTION OF THE DRAWINGS

Implementations of the inventive concepts disclosed herein may be better understood when consideration is given to the following detailed description thereof. Such description makes reference to the included drawings, which are not necessarily to scale, and in which some features may be exaggerated and some features may be omitted or may be represented schematically in the interest of clarity. Like reference numerals in the drawings may represent and refer to the same or similar element, feature, or function. In the drawings.

DETAILED DESCRIPTION

Figure 1:
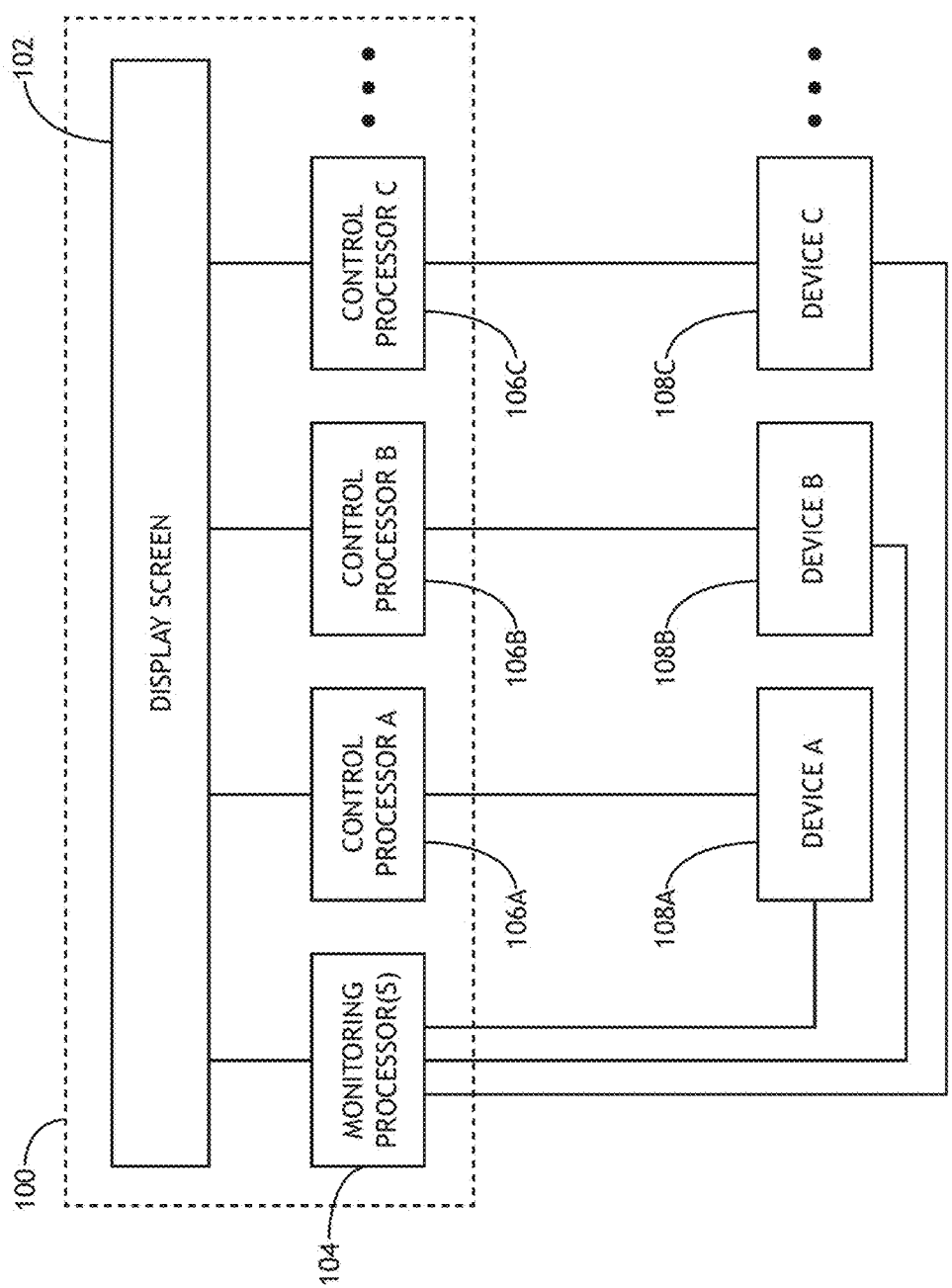
FIG. 1 is a block diagram of an exemplary display system according to an exemplary embodiment of the inventive concepts disclosed herein.

Before explaining at least one embodiment of the inventive concepts disclosed herein in detail, it is to be understood that the inventive concepts are not limited in their application to the details of construction and the arrangement of the components or steps or methodologies set forth in the following description or illustrated in the drawings. In the following detailed description of embodiments of the instant inventive concepts, numerous specific details are set forth in order to provide a more thorough understanding of the inventive concepts. However, it will be apparent to one of ordinary skill in the art having the benefit of the instant disclosure that the inventive concepts disclosed herein may be practiced without these specific details. In other instances, well-known features may not be described in detail to avoid unnecessarily complicating the instant disclosure. The inventive concepts disclosed herein are capable of other embodiments or of being practiced or carried out in various ways. Also, it is to be understood that the phraseology and terminology employed herein is for the purpose of description and should not be regarded as limiting.

As used herein a letter following a reference numeral is intended to reference an embodiment of the feature or element that may be similar, but not necessarily identical, to a previously described element or feature bearing the same reference numeral (e.g., 1, 1a, 1b). Such shorthand notations are used for purposes of convenience only, and should not be construed to limit the inventive concepts disclosed herein in any way unless expressly stated to the contrary.

Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of the "a" or "an" are employed to describe elements and components of embodiments of the instant inventive concepts. This is done merely for convenience and to give a general sense of the inventive concepts, and "a" and "an" are intended to include one or at least one and the singular also includes the plural unless it is obvious that it is meant otherwise.

Finally, as used herein any reference to "one embodiment," or "some embodiments" means that a particular element, feature, structure, or characteristic described in connection with the embodiment is included in at least one embodiment of the inventive concepts disclosed herein. The appearances of the phrase "in some embodiments" in various places in the specification are not necessarily all referring to the same embodiment, and embodiments of the inventive concepts disclosed may include one or more of the features expressly described or inherently present herein, or any combination of sub-combination of two or more such features, along with any other features which may not necessarily be expressly described or inherently present in the instant disclosure.

Reference will now be made in detail to exemplary embodiments of the inventive concepts disclosed herein, examples of which are illustrated in the accompanying drawings.

Embodiments in accordance with the inventive concepts disclosed herein are directed to display systems (e.g., synoptic displays) and methods for configuring such display systems so that they can be used to display status information of various devices and serve as interfaces for controlling at least some of the devices. It is contemplated that display systems configured in accordance with embodiments of the inventive concepts disclosed herein may help reduce the number of control panels/displays needed without compromising the safety of any of the devices being monitored and/or controlled.

Referring generally to FIG. 1, a block diagram of an exemplary display system 100 configured in accordance with an embodiment of the inventive concepts disclosed herein is shown. The display system 100 may include a display 102 in communication with one or more monitoring processors 104. The monitoring processor(s) 104 may be configured to monitor the status of one or more devices 108 and report the status of the devices 108 to a user (e.g., a pilot) through the display 102.

The display system 100 may also include one or more control processors 106 configured to facilitate control of at least some of the devices 108 using the display 102. In some embodiments, the control processors 106 are separate entities (which may be implemented as dedicated processing units, application-specific integrated circuits (ASICs), field-programmable gate arrays (FPGAs) or various other types of processors or processing units) configured to operate independently with respect to each other and with respect to the monitoring processor(s) 104. The separation between the control processors 106 with respect to each other ensures that each particular control processor 106 can only performs its intended control functions. The separation with respect to the monitoring processor(s) 104 ensures that the status information reported by the monitoring processor(s) 104 cannot be unintentionally manipulated by any of the control processor(s) 106, and vice versa. In other words, configuring the control processors 106 as separate entities effectively allows status report(s) provided by the monitoring processor(s) 104 and control interface(s) provided by the control processor(s) 106 to be visually presented on the same display 102 without compromising the safety of the devices 108 being monitored and/or controlled.

Figure 2:
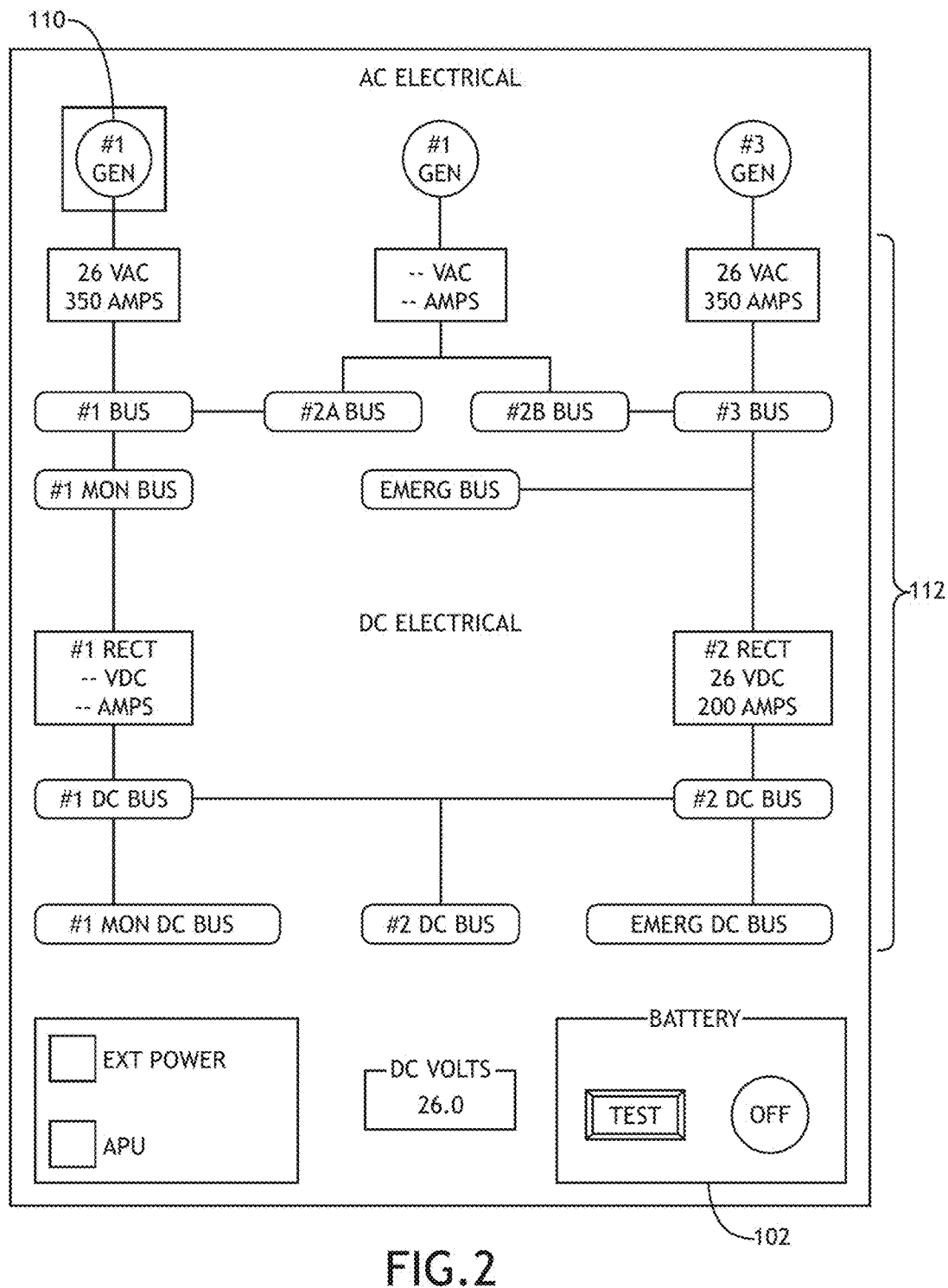
FIG. 2 is an illustration depicting an exemplary control interface visually presented along with an exemplary status report on an exemplary display according to an exemplary embodiment of the inventive concepts disclosed herein.

FIG. 2 shows an exemplary control interface 110 that may be visually presented on the display 102 along with an exemplary status report 112. From the user's perspective, the control interface 110 and the status report 112 are components of an integrated human machine interface. Functionally, however, the status report 112 is driven by one or more monitoring processors 104 that are responsible for the monitoring the status of one or more devices 108. The control interface 110, on the other hand, is driven by a particular control processor 106 configured to control a particular device 108. Upon receiving a user input through the control interface 110, for example, the user input may be sent to the particular control processor 106, which may process the user input and control the particular device 108 accordingly.

It is to be understood that both the control interface 110 and the status report 112 depicted in FIG. 2 are shown to be in communication with an electrical device (e.g., an electrical system of an aircraft) merely for illustrative purposes. It is contemplated that multiple control interfaces 110 driven by multiple control processors 106 may be visually presented on the display 102 and serve as interfaces for controlling multiple devices 108 (of the same or different types) without departing from the broad scope of the inventive concepts disclosed herein.

Figure 3:
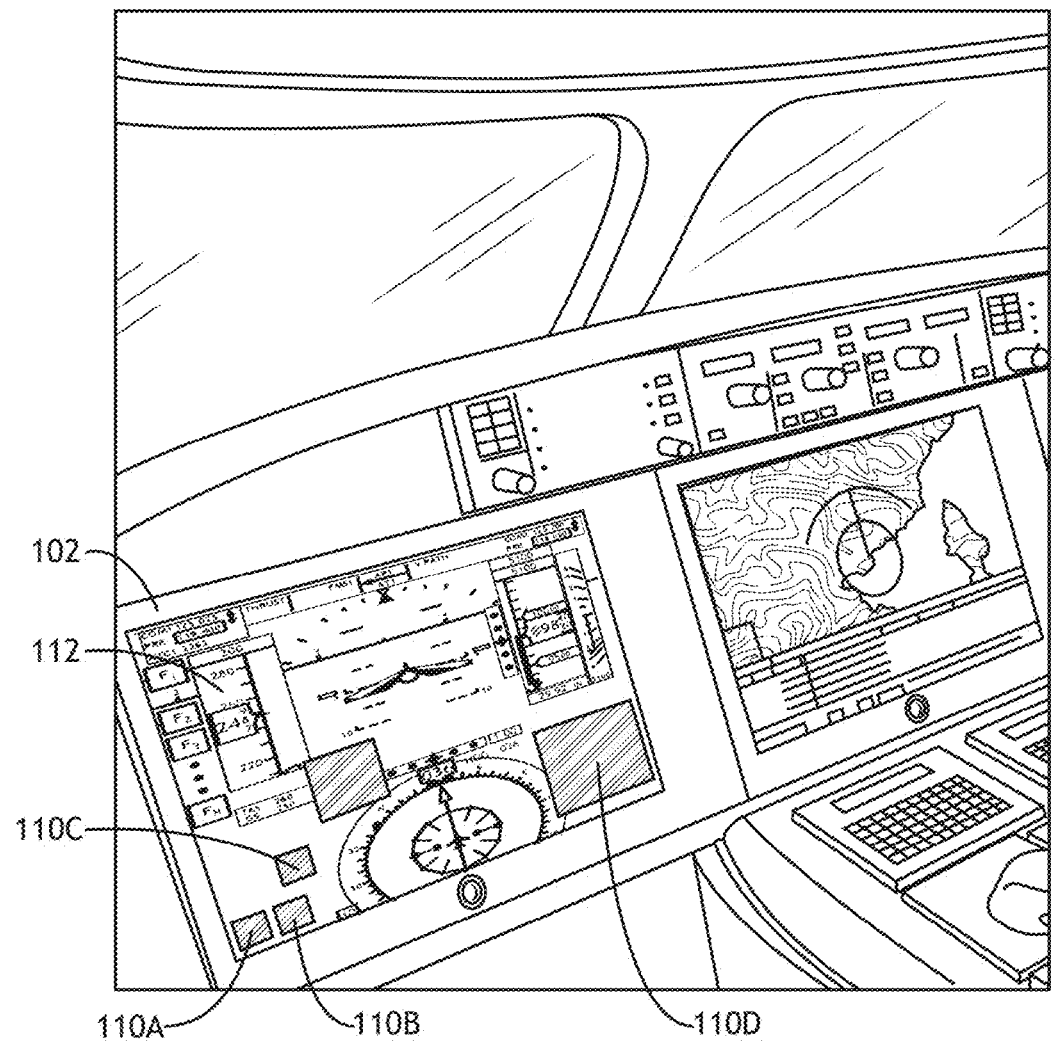
FIG. 3 is an illustration depicting multiple exemplary control interfaces visually presented on an exemplary display according to an exemplary embodiment of the inventive concepts disclosed herein.

FIG. 3 is an exemplary depiction of multiple control interfaces 110A-110D visually presented on the same display 102. In some embodiments, when multiple control interfaces 110A-110D are visually presented on the same display 102, a user interaction with a particular control interface 110 may serve as a trigger to activate that particular control interface 110 and its corresponding control processor 106. For example, referring to FIGS. 1 and 3, if a user interacts with the display 102 in a region where control interface 110B is visually presented, the control processor 106B corresponding to the control interface 110B may be activated, and a user input received through the control interface 110B may be sent to the control processor 106B, which may process the user input and control the particular device 108B accordingly.

It is contemplated that display systems configured in accordance with embodiments of the inventive concepts disclosed herein may be appreciated in various types of applications, including flight displays or vehicle displays in general. Utilizing display systems configured in accordance with embodiments of the inventive concepts disclosed herein as flight displays, for example, may help reduce the number of control panels needed on flight decks. A flight display configured in this manner may also be more intuitive to operate.

It is noted that when display systems configured in accordance with embodiments of the inventive concepts disclosed herein are utilized as flight displays, it may be beneficial for such display systems to conform to a certain standard in order to provide a certain level of consistency. For example, Aeronautical Radio, Incorporated (ARINC) 661 is a standard which aims to normalize the definition of a cockpit display system and the communication between the cockpit display system and other devices onboard an aircraft. It is contemplated that the control processors 106 configured in accordance with embodiments of the inventive concepts disclosed herein may be configured to conform to a standard, such as ARINC 661 or the like, to facilitate communications with the display 102 and/or the devices 108 control by the control processors 106. It is to be understood, however, that whether (or how) to apply such standards may vary based on various factors without departing from the broad scope of the inventive concepts disclosed herein.

It is also to be understood that while the display 102 depicted in the examples above may be implemented as a touch display capable of receiving touch inputs from users, such a display is presented merely for illustrative purposes and is not meant to be limiting. It is contemplated that the display system 100 may be configured to receive user inputs through other types of input devices in addition to (or instead of) touch input devices. For instance, the display system 100 may be configured to receive user inputs in the forms of cursor commands, voice commands, gesture commands, eye tracker commands or the like.

Furthermore, it is to be understood that while the display 102 depicted in the examples above may be implemented as a head-down display positioned on a flight deck, such an implementation is merely exemplary and is not meant to be limiting. It is contemplated that the display 102 may be implemented as a head-up display, a portable display, a wearable display, as well as various other types of displays without departing from the broad scope of the inventive concepts disclosed herein.

Figure 4:
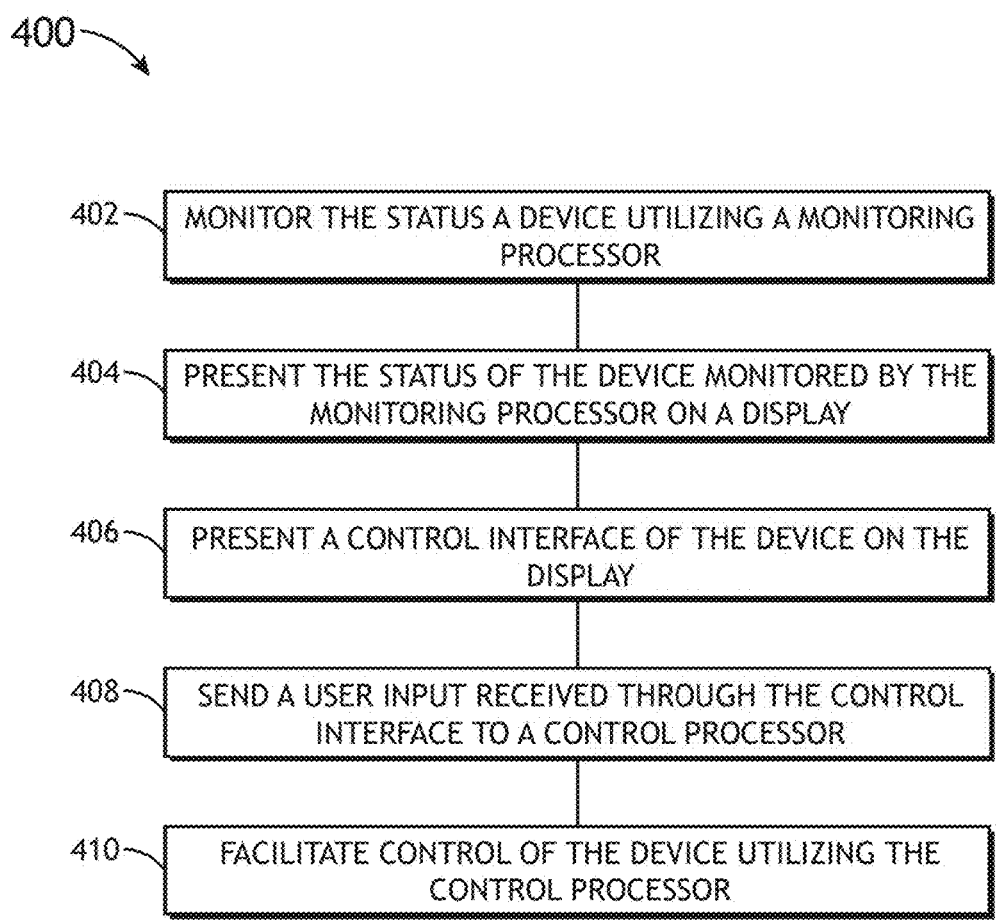
FIG. 4 is a flow diagram of an exemplary display control method according to an exemplary embodiment of the inventive concepts disclosed herein.

Referring now to FIG. 4, a flow diagram depicting an embodiment of a display control method 400 in accordance with the inventive concepts disclosed herein is shown. The display control method 400 may be carried out by a plurality of processors in communication with a display. At least one of the plurality of processors may serve as a monitoring processor and at least one different processor of the plurality of processors may serve as a control processor. The monitoring processor may monitor the operating status of a device in a step 402. The monitoring processor may also process the operating status of the device and present the operating status of the device to a user via a display in a step 404.

A control interface may also be presented to the user in a step 406. The user may interact with the control interface and issue one or more user inputs directed to control the device being monitored. The user input(s) received through the control interface may be sent to the control processor in a step 408. The control processor may then process the user input(s) and control the device accordingly in a step 410.

As will be appreciated from the above, display systems and methods configured in accordance with embodiments of the inventive concepts disclosed herein may help reduce the number of control panels needed while also making the human machine interface more intuitive to operate. Additionally, it is noted that providing a display with visually integrated and functionally separated monitoring and control abilities may allow the design assurance level of such a display to be reduced by at least one step, which may in turn reduce the cost of the display compared to conventional implementations using synoptic displays and separate control panels. It is contemplated that display systems configured in accordance with embodiments of the inventive concepts disclosed herein may be utilized in safely-critical applications (e.g., as flight/synoptic displays), but may also be utilized in various types of applications without departing from the broad scope of the inventive concepts disclosed herein.

From the above description, it is clear that the inventive concepts disclosed herein are well adapted to carry out the objects and to attain the advantages mentioned herein as well as those inherent in the inventive concepts disclosed herein. While presently preferred embodiments of the inventive concepts disclosed herein have been described for purposes of this disclosure, it will be understood that numerous changes may be made which will readily suggest themselves to those skilled in the art and which are accomplished within the broad scope and coverage of the inventive concepts disclosed and claimed herein.

It is believed that the inventive concepts disclosed herein and many of their attendant advantages will be understood by the foregoing description, and it will be apparent that various changes may be made in the form, construction, and arrangement of the components thereof without departing from the broad scope of the inventive concepts or without sacrificing all of their material advantages. The form herein before described being merely an explanatory embodiment thereof, it is the intention of the following claims to encompass and include such changes.

What is claimed is:

1. A system, comprising:
    a display comprising a status report and an interactive control interface visually presented on a screen of the display;
    at least one monitoring processor in communication with the display, the at least one monitoring processor configured to monitor a status of at least one device and present the status of the at least one device on the status report of the display; and
    at least one control processor in communication with the display, the at least one control processor configured to operate independently with respect to the at least one monitoring processor, the at least one control processor further configured to process a user input and facilitate control of the at least one device based on the user input received through the interactive control interface.

2. The system of claim 1, wherein the display comprises a touch display and the user input is received through the screen of the display.

3. The system of claim 1, wherein the at least one control processor comprises a plurality of control processors, wherein each of the plurality of control processors is configured to operate independently with respect to other control processors of the plurality of control processors.

4. The system of claim 3, wherein the at least one device comprises a plurality of devices onboard a vehicle.

5. The system of claim 4, wherein each control processor of the plurality of control processors is configured to facilitate control of one of the plurality of devices onboard the vehicle.

6. The system of claim 4, wherein each control processor of the plurality of control processors is configured to conform to a standard when communicating with the display.

7. The system of claim 6, wherein the standard comprises an Aeronautical Radio, Incorporated (ARINC) 661 standard.

8. A system, comprising:
    a display comprising a status report and an interactive control interface visually presented on a screen of the display;
    at least one monitoring processor in communication with the display, the at least one monitoring processor configured to monitor an operating status of the at least one device and present the operating status of the at least one device on the on the status report of the display; and
    at least one control processor in communication with the display, the at least one control processor configured to operate independently with respect to the at least one monitoring processor, the at least one control processor further configured to present the interactive control interface of the at least one device on the display screen, process a user input, and facilitate control of the at least one device based on the user input received through the interactive control interface.

9. The system of claim 8, wherein display comprises a touch display and the user input is received via the screen of the display.

10. The system of claim 8, wherein the at least one control processor comprises a plurality of control processors, wherein each of the plurality of control processors is configured to operate independently with respect to other control processors of the plurality of control processors.

11. The system of claim 10, wherein the at least one device comprises a plurality of devices onboard a vehicle.

12. The system of claim 11, wherein each control processor of the plurality of control processors is configured to facilitate control of one of the plurality of devices onboard the vehicle.

13. The system of claim 11, wherein each control processor of the plurality of control processors is configured to conform to a standard when communicating with the display.

14. The system of claim 13, wherein the standard comprises an Aeronautical Radio, Incorporated (ARINC) 661 standard.

15. A method, comprising:
monitoring a status of at least one device utilizing at least one monitoring processor;
presenting the status of the at least one device monitored by the at least one monitoring processor on a status report of a screen of a display;
presenting a control interface of the at least one device on the screen of the display;
sending a user input received through the control interface to at least one control processor, wherein the at least one control processor is configured to operate independently with respect to the at least one monitoring processor; and
facilitating control of the at least one device utilizing the at least one control processor through the control interface.

16. The method of claim 15, wherein the at least one control processor comprises a plurality of control processors, wherein each of the plurality of control processors is configured to operate independently with respect to other control processors of the plurality of control processors.

17. The method of claim 16, wherein the at least one device comprises a plurality of devices onboard a vehicle.

18. The method of claim 17, wherein each control processor of the plurality of control processors is configured to facilitate control of one of the plurality of devices onboard the vehicle.

19. The method of claim 17, wherein each control processor of the plurality of control processors is configured to conform to a standard when presenting the control interface of the at least one device on the display.

20. The method of claim 19, wherein the standard comprises an Aeronautical Radio, Incorporated (ARINC) 661 standard.

* * * * *